(12) United States Patent
Imura et al.

(10) Patent No.: US 7,986,116 B2
(45) Date of Patent: Jul. 26, 2011

(54) APPARATUS FOR CONTROLLING TORQUE OF ELECTRIC ROTATING MACHINE

(75) Inventors: Akihiro Imura, Aichi-ken (JP); Tomoya Takahashi, Kariya (JP)

(73) Assignee: Denso Corporation, Kariya (JP)

( * ) Notice: Subject to any disclaimer, the term of this patent is extended or adjusted under 35 U.S.C. 154(b) by 421 days.

(21) Appl. No.: 12/340,809

(22) Filed: Dec. 22, 2008

(65) Prior Publication Data

US 2009/0160381 A1  Jun. 25, 2009

(30) Foreign Application Priority Data

Dec. 21, 2007  (JP) ................................. 2007-329458
May 23, 2008  (JP) ................................. 2008-135203

(51) Int. Cl.
*H02P 6/06* (2006.01)
*H02P 21/14* (2006.01)

(52) U.S. Cl. ......... 318/400.15; 318/400.02; 318/400.39; 318/432; 318/494

(58) Field of Classification Search ............. 318/400.02, 318/400.13, 400.15, 400.39, 432, 494; 180/443; 701/43

See application file for complete search history.

(56) References Cited

U.S. PATENT DOCUMENTS

| | | | | |
|---|---|---|---|---|
| 5,903,129 A | * | 5/1999 | Okuno et al. | 318/721 |
| 6,777,897 B2 | * | 8/2004 | Murai | 318/400.2 |
| 6,836,085 B2 | * | 12/2004 | Kawada et al. | 318/139 |
| 7,486,043 B2 | * | 2/2009 | Atarashi | 318/494 |
| 7,538,510 B2 | * | 5/2009 | Atarashi et al. | 318/494 |
| 7,548,038 B2 | * | 6/2009 | Atarashi et al. | 318/494 |
| 7,671,552 B2 | * | 3/2010 | Tonami et al. | 318/400.02 |
| 7,694,777 B2 | * | 4/2010 | Yamashita et al. | 180/443 |
| 7,728,541 B2 | * | 6/2010 | Subrata et al. | 318/449 |
| 7,733,044 B2 | * | 6/2010 | Nakamura et al. | 318/400.02 |
| 2003/0057003 A1 | * | 3/2003 | Kawada et al. | 180/65.1 |
| 2003/0155878 A1 | * | 8/2003 | Murai | 318/268 |
| 2005/0242765 A1 | * | 11/2005 | Ta et al. | 318/799 |
| 2006/0113929 A1 | * | 6/2006 | DeLange et al. | 318/63 |

(Continued)

FOREIGN PATENT DOCUMENTS

| | | |
|---|---|---|
| JP | 2-111281 | 4/1990 |
| JP | 7-194200 | 7/1995 |
| JP | 10-243699 | 9/1998 |
| JP | 2000-050689 | 2/2000 |

(Continued)

OTHER PUBLICATIONS

Japanese Office Action dated Nov. 24, 2009, issued in corresponding Japanese Application No. 2008-135203, with English translation.

*Primary Examiner* — Paul Ip
(74) *Attorney, Agent, or Firm* — Nixon & Vanderhye PC

(57) ABSTRACT

The apparatus is for controlling a torque of an electric rotating machine at a command torque by supplying command voltages in accordance with the command torque to a power conversion circuit driving the electrical rotating machine. The apparatus includes a detecting function of detecting an input voltage of the power conversion circuit to be power-converted and thereafter applied to the electric rotating machine as a drive voltage, and a control function of setting a command current corresponding to one of two current components in a 2-phase coordinate system of the electric rotating machine in accordance with a command torque directed from outside, and thereafter determining command voltages corresponding to two voltage components of the 2-phase coordinate system on the basis of the command current and the input voltage of the power conversion circuit.

18 Claims, 12 Drawing Sheets

U.S. PATENT DOCUMENTS

| | | | |
|---|---|---|---|
| 2008/0035411 A1* | 2/2008 | Yamashita et al. | 180/443 |
| 2009/0021194 A1* | 1/2009 | Tonami et al. | 318/400.02 |
| 2009/0079370 A1* | 3/2009 | Nakamura et al. | 318/400.02 |
| 2009/0160381 A1* | 6/2009 | Imura et al. | 318/400.15 |
| 2010/0194319 A1* | 8/2010 | Ito et al. | 318/400.13 |

FOREIGN PATENT DOCUMENTS

| | | |
|---|---|---|
| JP | 2005-020998 | 1/2005 |
| JP | 2005-065410 | 3/2005 |
| JP | 2006-254572 | 9/2006 |
| JP | 2007-124722 | 5/2007 |

* cited by examiner

Iq-TORQUE CHARACTERISTIC

Iq-Vd CHARACTERISTIC

APPARATUS FOR CONTROLLING TORQUE OF ELECTRIC ROTATING MACHINE

CROSS-REFERENCE TO RELATED APPLICATION

This application is related to Japanese Patent Applications No. 2007-329458 filed on Dec. 21, 2007, and No. 2008-135203 filed on May 23, 2008, the contents of which are hereby incorporated by reference.

BACKGROUND OF THE INVENTION

1. Field of the Invention

The present invention relates to a control apparatus of an electrical rotating machine, which operates to control a power conversion apparatus such as an inverter in order to keep the torque of the electric rotating machine at a command value.

2. Description of Related Art

As such a control apparatus, there is known an apparatus configured to calculate a command current in the d-axis by subtracting a command voltage in the q-axis from the square root of the square of a maximum value of an input voltage of an inverter less the square of a command voltage in the d-axis. For example, refer to Japanese Patent Application Laid-open No. 2006-254572. It is alleged that according to the above control apparatus, it is possible to set the command current in the d-axis to an optimum value during a saturated voltage period in which the voltage to be applied to a motor is at the level of the above maximum value.

However, this conventional control apparatus has a problem in that it cannot perform torque control with a high degree of precision, and is complicated in structure.

SUMMARY OF THE INVENTION

The present invention provides an apparatus for controlling a torque of an electric rotating machine at a command torque by supplying command voltages in accordance with the command torque to a power conversion circuit driving the electrical rotating machine; comprising:

a detecting function of detecting an input voltage of the power conversion circuit to be power-converted and thereafter applied to the electric rotating machine as a drive voltage; and a first control function of setting a command current corresponding to one of two current components in a 2-phase coordinate system of the electric rotating machine in accordance with a command torque directed from outside, and thereafter determining command voltages corresponding to two voltage components of the 2-phase coordinate system on the basis of the command current and the input voltage of the power conversion circuit, to thereby enable controlling a torque of the electric rotating machine in accordance with only the command current corresponding to one of two current components of the 2-phase coordinate system.

The present invention also provides an apparatus for controlling a torque of a salient-pole type electric rotating machine at a command torque by supplying command voltages corresponding to voltage components of a 2-phase coordinate system of the electric rotating machine in accordance with the command torque to a power conversion circuit driving the electrical rotating machine, comprising:

a detecting function of detecting an input voltage of the power conversion circuit to be power-converted and thereafter applied to the electric rotating machine as a drive voltage; and a first control function of setting at least one of command currents corresponding to current components of the 2-phase coordinate system in accordance with the command torque to thereby determine the command voltages;

wherein the first control function sets, on the basis of the command voltage corresponding to one of the two voltage components which depends on the one of the current components and the input voltage of the power conversion circuit, the command voltage corresponding to the other of the two voltage components, when the command voltage corresponding to the one of the two voltage components exceeds a predetermined value to thereby enable controlling a torque of the electric rotating machine in accordance with only the command current corresponding to the one of the two current components.

According to the present invention, it becomes possible to control the torque of an electric rotating machine driven through a power conversion circuit by a control apparatus simple in structure.

Other advantages and features of the invention will become apparent from the following description including the drawings and claims.

PREFERRED EMBODIMENTS OF THE INVENTION

First Embodiment

Figure 1:
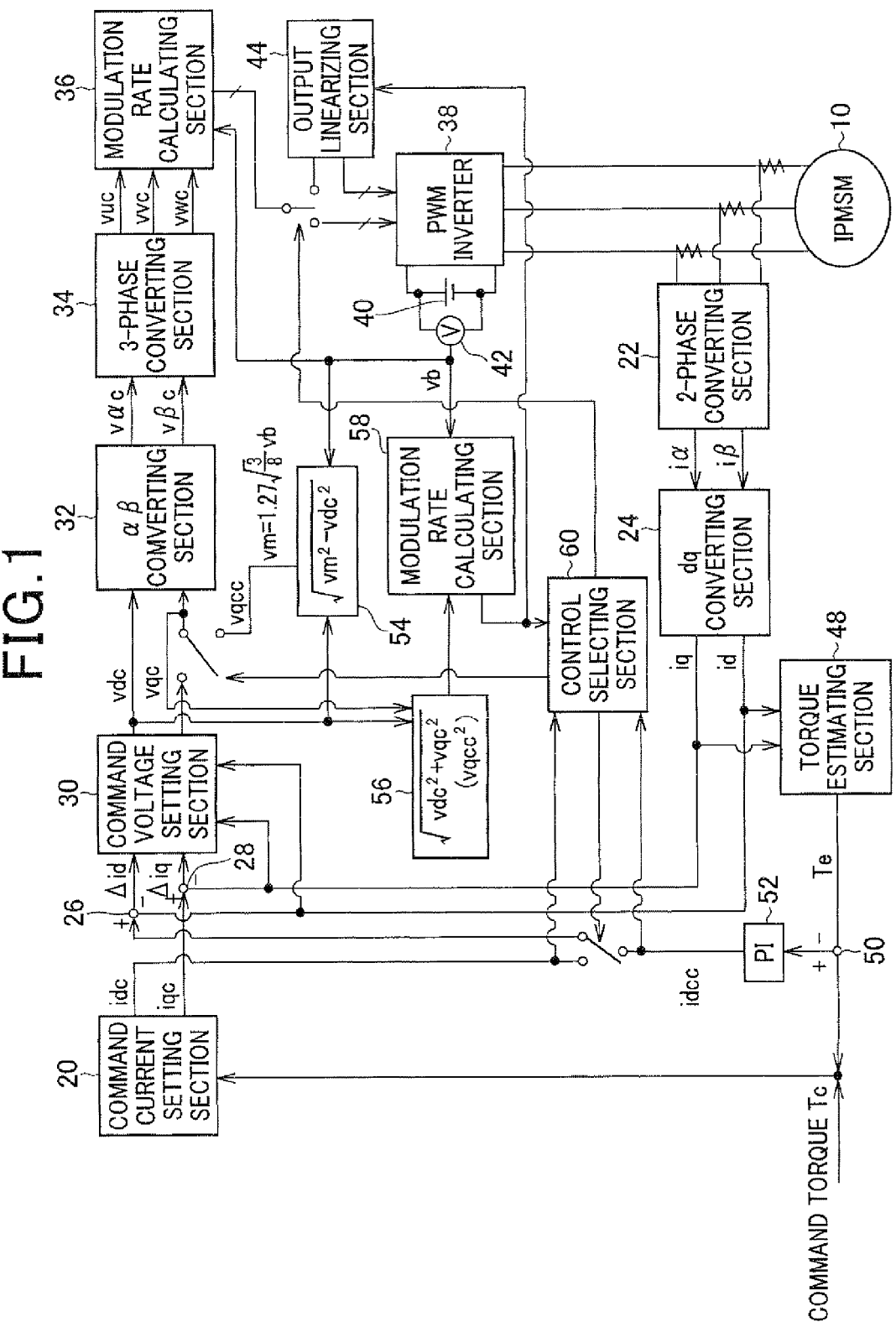
FIG. 1 is a diagram showing an overall structure of a control apparatus for an electric rotating machine of a first embodiment of the invention.

FIG. 1 is a diagram showing an overall structure of a control apparatus of an electric rotating machine according to a first embodiment of the invention. This control apparatus controls a PWM inverter 38 driving an electrical motor 10. The motor 10 is a three-phase permanent magnet synchronous motor of the salient-pole type. In more detail, the motor 10 is an IPMSM (Interior Permanent Magnet Synchronous Motor).

In the following, a process regarding vector control, a process regarding field-weakening control, and a process regarding switching between the vector control and the field-weakening control are explained in this order.

Process Regarding Vector Control

The command current setting section 20 sets a command current idc in the d-axis, and a command current iqc in the q-axis in accordance with a command torque Tc to the motor 10. Here, the d-axis is an axis toward the N pole of the permanent magnet of the motor 10, and the q-axis is an axis perpendicular to the d-axis. The 2-phase converting section 22 converts actual currents iu, iv and iw respectively flowing through the U-phase, V-phase and W-phase of the motor 10 into actual currents iα and iβ in the α-axis and β-axis as two components of the fixed 2-phase coordinate system. The dq converting section 24 converts the actual currents iα and iβ into actual currents id and iq in the d-axis and q-axis in accordance with a rotation angle of the motor 10, as two components of the rotating 2-phase coordinate system. The subtracting section 26 calculates a difference value Δid by subtracting the actual current id in the d-axis from the command current idc in the d-axis. The subtracting section 28 calculates a difference value Δiq by subtracting the actual current iq in the q-axis from the command current iqc in the q-axis.

Figure 2:
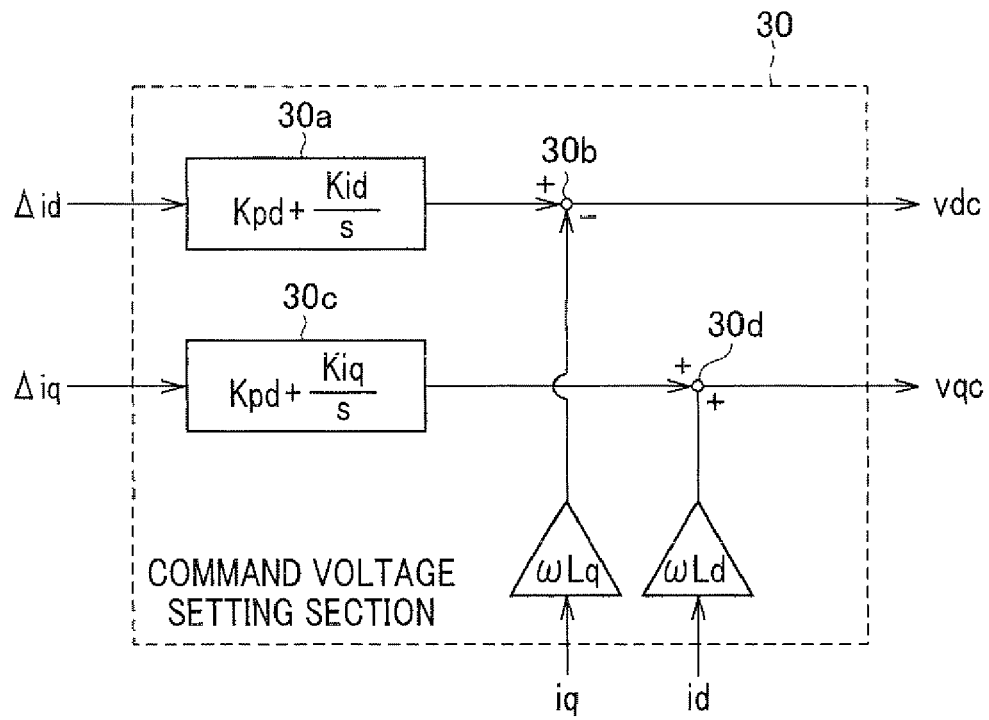
FIG. 2 is a block diagram showing a structure of a command voltage setting section included in the control apparatus of the first embodiment.

The command voltage setting section 30 sets the command voltage vdc in the d-axis and the command voltage vqc in the q-axis on the basis of the difference values Δid and Δiq, and the actual currents id and iq. In more detail, as shown in FIG. 2, the command voltage setting section 30 sets the command voltages vdc and vqc by performing a feedback control in accordance with the difference values Δid and Δiq, and also a decoupling control. More specifically, the feedback control section 30a performs a proportional integration operation on the difference value Δid in the d-axis inputted thereto to calculate a feedback amount in feed-backing the actual current id in the d-axis to the command current idc in the d-axis. The decoupling control section 30b calculates the command voltage vdc in the d-axis by subtracting the value of ω·Lq·iq from the value of the output of the feedback control section 30a. Here, ω is a rotational speed of the motor 10, and Lq is an inductance of the q-axis of the motor 10. On the other hand, the feedback control section 30c performs a proportional integration operation on the difference value Δiq in the q-axis inputted thereto to calculate a feedback amount in feed-backing the actual current iq in the q-axis to the command current iqc in the q-axis. The decoupling control section 30d calculates the command voltage vqc in the q-axis by subtracting the value of ω·Ld·id from the value of the output of the feedback control section 30c. Here, Ld is an inductance of the d-axis of the motor 10. In the above, a decoupling term of a component including an induced voltage is omitted.

The αβ converting section 32 shown in FIG. 1 converts the command voltages vdc and vqc in the d-axis and q-axis into the command voltages vαc and vβc in the α-axis and β-axis as two components of the fixed 2-phase coordinate system in accordance with the rotation angle of the motor 10. The 3-phase converting section 34 converts the command voltages vαc and vβc into 3-phase command voltages vuc, vvc, vwc. The modulation rate calculating section 36 normalizes the 3-phase command voltages vuc, vvc, vwc in accordance with the terminal voltage vb of the battery 40 detected by the voltage sensor 42. The switching elements of the PWM inverter 38 are PWM-controlled in accordance with the output of the modulation rate calculating section 36. In this embodiment, since the vector control is performed until the modulation rate reaches 1.27, when the modulation rate exceeds 1, the switching elements are PWM-controlled in accordance with the output of the modulation rate calculating section 36 corrected by the output linearizing section 44. This is explained below with reference to FIG. 3.

Figure 3:
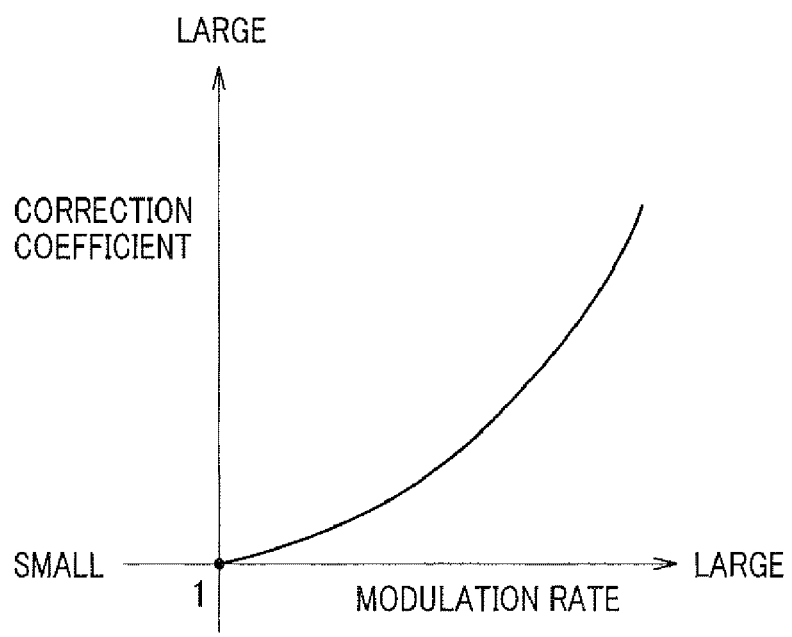
FIG. 3 is a diagram showing a relationship between a modulation rate and a correction factor set in an output linearizing section included in the control apparatus of the first embodiment.

As shown in FIG. 3, as the modulation rate becomes larger exceeding 1, the output of the modulation rate calculating section 36 is multiplied by a larger correction factor which exceeds 1. This is done to promptly bring the effective values of the drive voltages actually applied to the motor 10 to the levels of the effective values of the command voltages vuc, vvc, and vwc.

Incidentally, the reason for the vector control being continued until the modulation rate reaches 1.27 is that the theoretical critical point of the modulation rate at which controllability of the PWM control is significantly lowered is 1.27.

Process Regarding Field-Weakening Control

The torque estimating section 48 estimates the torque Te of the motor 10 on the basis of the actual currents id and iq in the d-axis and q-axis. In more detail, the torque estimating section 48 calculates the estimate torque Te in accordance with the equation of Te=p·{(Lq−Ld)·id·iq+Tk·iq}, where p is the number of pole pairs and Tk is a torque constant. The subtracting section 50 calculates a difference value by subtracting the estimate torque Te from the command torque Tc. The feedback control section 52 calculates the command current idcc in the d-axis as a feedback amount in feed-backing the estimate torque Te to the command torque Tc by performing proportional integration operation on this difference value. As a result, during the field-weakening control, the command current in the d-axis inputted into the command voltage setting section 30 is the command current idcc outputted from the feedback control section 52.

The q-axis voltage setting section 54 calculates the command voltage vqcc in the q-axis on the basis of the command voltage vdc in the q-axis outputted from the command voltage setting section 30 and the clamping voltage vm. The clamping voltage vm is the terminal voltage vb of the battery 40 multiplied by 1.27 and the square root of ⅜. This is for performing the vector control until the modulation rate becomes 1.27. In more detail, the q-axis voltage setting section 54 calculates, as the command voltage vqcc in the q-axis, the square root of the square of the clamping voltage vm less the square of the command voltage vdc in the d-axis. Accordingly, during the field-weakening control, the command voltage in the q-axis inputted into the αβ converting section 32 is the command voltage vqcc outputted from the q-axis voltage setting section 54.

Process Regarding Switching Between the Vector Control and the Field-Weakening Control The vector norm calculating section 56 calculates the norms of the vectors respectively corresponding to the command voltages vdc, and vqc (vqcc) inputted into the αβ converting section 32. The modulation rate calculating section 58 calculates the modulation rate on the basis of the norms calculated by the vector norm calculating section 56, and the terminal voltage vb of the battery 40. The control selecting section 60 performs a process related to activation of the output linearizing section 44, and a process related to switching between the vector control and the field-weakening control in accordance with the command current idc set by the command current setting section 20, the command current idcc set by the feedback control section 52, and the modulation rate calculated by the modulation rate calculating section 58.

Figure 4:
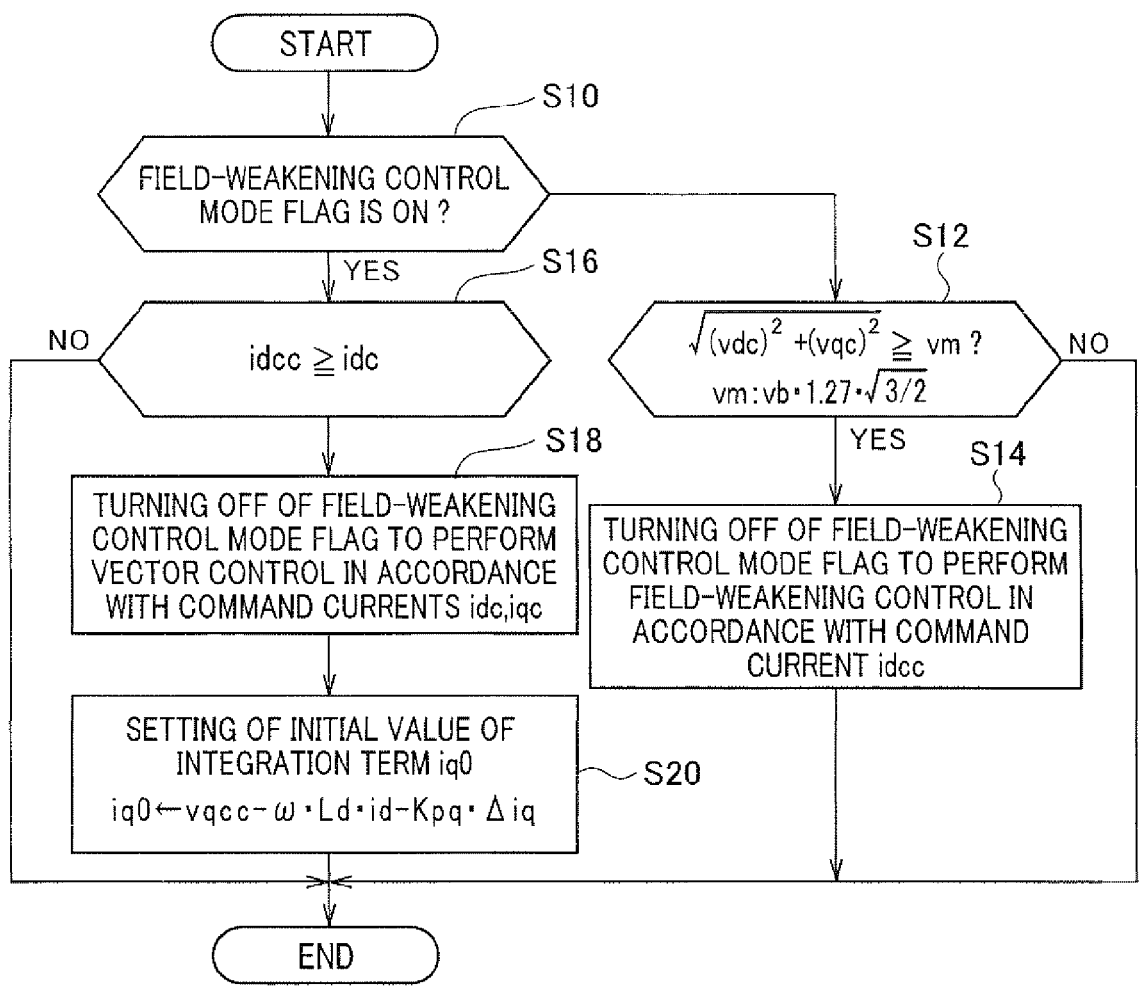
FIG. 4 is a flowchart showing an operation of a control selecting section included in the control apparatus of the first embodiment.

FIG. 4 is a flowchart showing the operation of the control selecting section 60. This operation, which is performed at regular time intervals, begins by determining at step S10 whether or not a field-weakening control mode flag is on to designate that the field-weakening control should be performed. If the determination result at step S10 is negative, the operation proceeds to step S12 to determine whether or not the norms of the vectors of the command voltages vdc and vqc in the d-axis and q-axis exceed the clamping voltage vm. Step S12 is provided for making a determination on the timing of switching to the field-weakening control. In other words, step S12 is provided for determining whether or not there will occur significant decrease in controllability to apply the motor 10 with the drive voltages whose effective values are the same as those of the command voltages vuc, vvc and vwc needed to perform the vector control.

If the determination result at step S12 is affirmative, the operation proceeds to step S14 where the field-weakening control mode flag is turned on, to perform the field-weakening control in accordance with the command current idcc outputted from the feedback control section 52. In the field-weakening control, the command voltage setting section 30 calculates the command voltage vdc in the d-axis on the basis of a difference value Δid equal to the command current idcc less the actual current id, and the actual current iq. On the other hand, the q-axis voltage setting section 54 calculates the command voltage vqcc in the q-axis on the basis of the clamping voltage vm and the command voltage vdc. As explained above, in the field-weakening control, any command current in the q-axis is not defined, and the command voltages vdc and vqcc are calculated on the basis of only the command current idcc.

If the determination result at step S10 is affirmative, the operation proceeds to step S16 to determine whether or not the command current idcc outputted from the feedback control section 52 is equal to or larger than the command current idc outputted from the command current setting section 20. Step S16 is provided for making a determination on the timing to switch from the field-weakening control to the vector control. That is, if the command current idcc in the d-axis needed to perform the field-weakening control is equal to or larger than the command current idc in the d-axis needed to perform the vector control, since the required effect of the field weakening does not exceed the level set by the command current setting section 20, switching to the vector control is carried out.

If the determination result at step S16 is affirmative, the operation proceeds to step S18 where the field-weakening control flag is turned off to perform the vector control in accordance with the command currents idc and iqc set by the command current setting section 20. That is, if the determination result at step S16 is affirmative, the switching elements of the inverter are on/off controlled in accordance with the command currents idc and iqc set in accordance with the command voltages vdc and vqc and the actual currents id and iq. At subsequent step S20, the initial value of the integration term in the proportional integration operation performed by the feedback control section 30c is set. Step S20 is provided because of the reason that during the field-weakening control, the output of the feedback control section 30c is not reflected to the control. In this embodiment, at step S20, a process to suppress an unintended variation of the command voltage in the q-axis at the time of switching the control is performed. In more detail, this process is to cause the feedback control section 30c to output a value appropriate with respect to the value which the q-axis voltage setting section 54 outputted immediately before the switching. To this end, the initial value of the integration term is set to the value of Vqcc−ω·Ld·id−Kpq·Δiq.

If the determination result at step S12 or step S16 is negative, or when step S12 or S20 is completed, the operation is terminated.

According to the above operation, it is possible to control the torque of the motor 10 with a high degree of precision even in the high-speed region of the motor 10. In this embodiment, the field-weakening control is applied to the IPMSM (Interior Permanent Magnet Synchronous Motor). Accordingly, as explained above, the torque is represented by the expression of p·{(Lq−Ld)·id·iq+Tk·iq}. That is, the torque depends not only the q-axis current but also d-axis current. Hence, according to this embodiment, the torque can be controlled appropriately by properly setting the command current idcc in the d-axis even during the voltage saturation period in which the output voltage of the inverter is the same as the terminal voltage vb of the battery 40.

Figure 5:
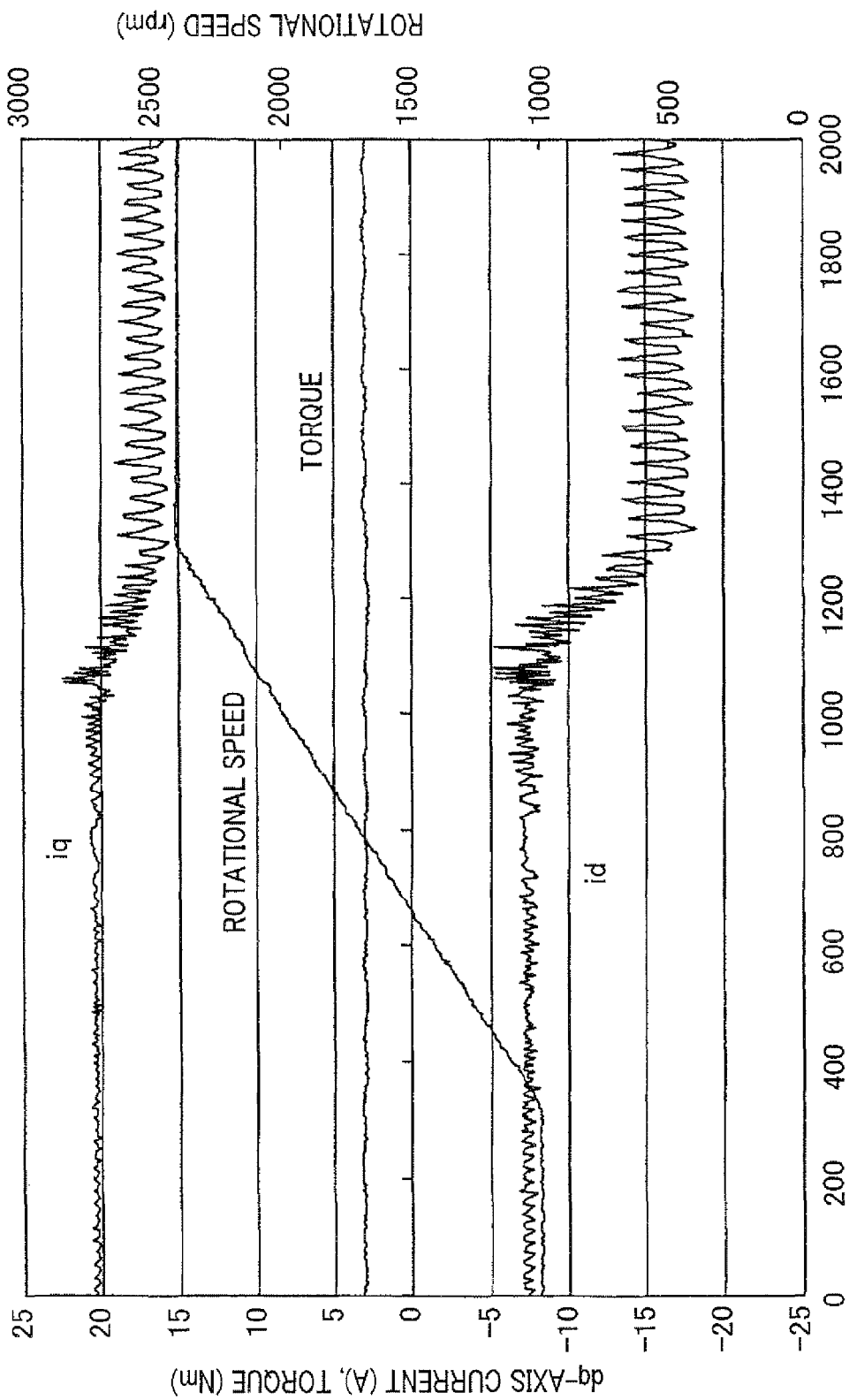
FIG. 5 is a diagram showing measurements of actual currents in the d-axis and the q-axis, and torque of a motor during a transient period from vector control to field-weakening control in the control apparatus of the first embodiment.

FIG. 5 is a diagram showing measurements of the actual currents in the d-axis and q-axis, and the torque of the motor 10 during the transient period from the vector control to the field-weakening control. As seen from FIG. 5, as the rotational speed of the motor 10 increases, the vector control is smoothly shifted to the field-weakening control, and accordingly the torque of the motor 10 can be made stable during the transient period and also after the switching of the control.

The above described first embodiment of the invention provides the following advantages.

(1) The command voltage vqcc in the q-axis is set in accordance with the command voltage vdc which depends on the command current idcc in the d-axis, and the input voltage of the inverter (the terminal voltage vb of the battery 40), in order to control the torque of the motor 10 on the basis of only the command current idcc. Accordingly, the structure of the apparatus for controlling the motor 10 can be simplified.

(2) The command current idcc in the d-axis is set in accordance with the difference between the estimate torque Te and the command torque Tc. This makes it possible to appropriately feedback the estimate torque Te to the command torque Tc.

(3) When the vector norms of the command voltages vdc and vqc exceed the clamping voltage vm, the vector control is switched to the field-weakening control. This makes it possible to start the field-weakening control before the controllability of the vector control excessively lowers, and to keep the torque controllability at high level in the high speed region of the motor 10.

(4) The command current idcc in the d-axis is calculated on the basis of the difference between the estimate torque Te of the motor 10 and the command torque Tc independently of the command current idc in the d-axis set by the command current setting section 20. This makes it possible to prevent the command from the vector control and the command from the field-weakening control interfering with each other during the field-weakening control in accordance with the command current idcc.

(5) When the command current idcc and the command current idc become equal to each other, the field-weakening control is switched to the vector control. This makes it possible to determine with ease the proper timing to switch from the field-weakening control to the vector control.

(6) When the field-weakening control is switched to the vector control, the initial value of the integration term in the proportional integration operation performed by the feedback control section 30c is determined on the basis of the command voltage vqcc being set by the q-axis voltage setting section 54. This makes it possible to prevent the command voltage in the q-axis varying in a discontinuous manner during the transition period from the field-weakening control to the vector control.

(7) When the modulation rate exceeds 1, the voltage to be PWM-controlled is increased depending on the degree by which the drive voltage to be applied to the motor 10 exceeds the terminal voltage vb of the battery 40. This makes it possible to promptly bring the effective value of the drive voltage actually applied to the motor 10 to the effective value of the voltage intended to be applied to the motor 10.

Second Embodiment

Next, a second embodiment of the invention is described with emphasis on the difference with the first embodiment.

Figure 6:
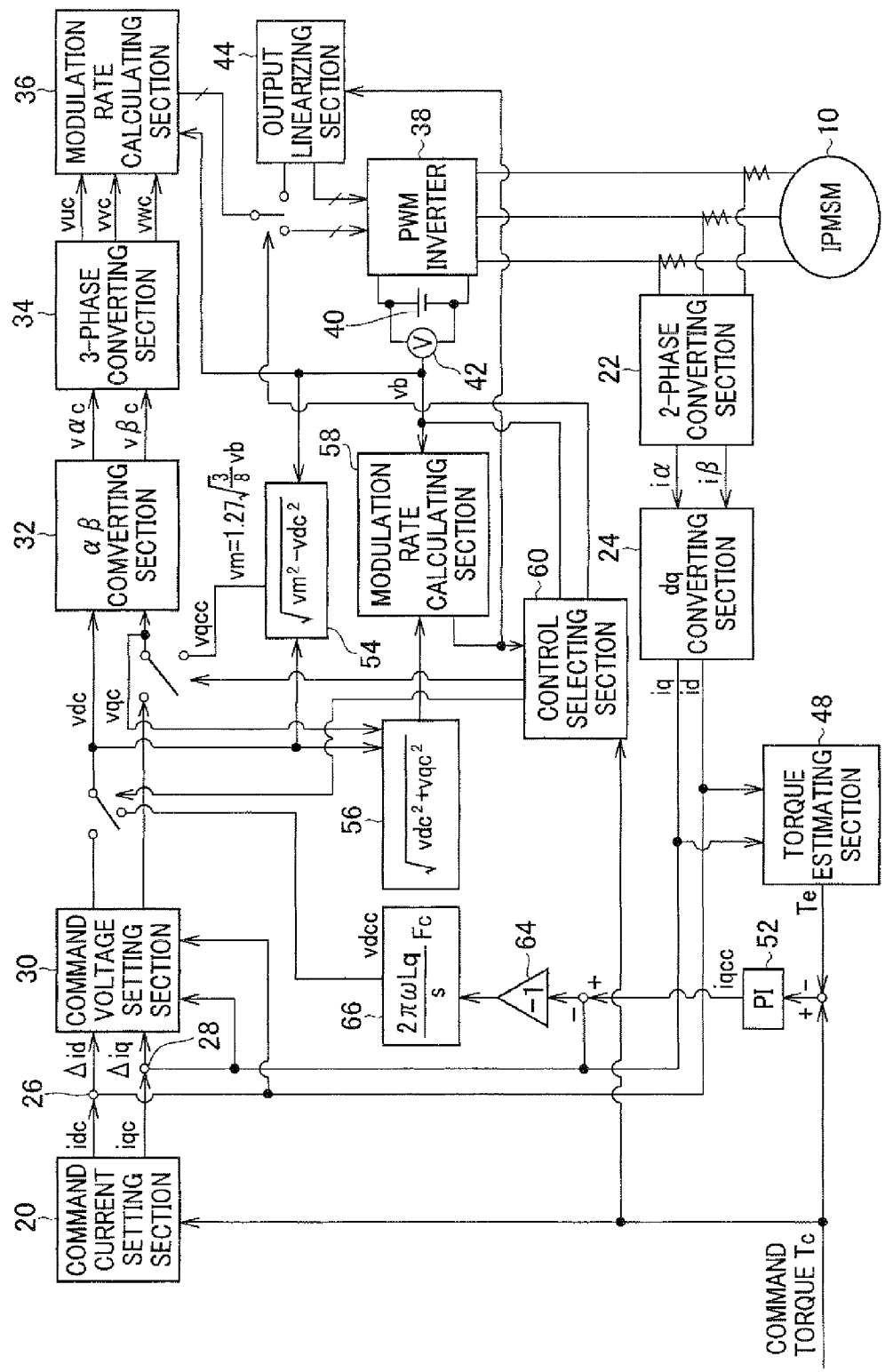
FIG. 6 is a diagram showing an overall structure of a control apparatus for an electric rotating machine of a second embodiment of the invention.

FIG. 6 is a diagram showing an overall structure of a control apparatus according to the second embodiment of the invention. This control apparatus is for controlling a PWM inverter 38 which drives the electrical motor 10. In this embodiment, the same reference characters are used for the elements or processes corresponding to those of the first embodiment.

As shown in FIG. 6, in the second embodiment, the command voltages vdc and vqc are determined from only the command current iqcc in the q-axis to perform the field-weakening control. In more detail, the feedback control section 52 calculates the command current iqcc in the q-axis as a feedback operation amount in feedbacking the estimate torque Te to the command torque Tc. This is done by performing the proportional integration operation on the difference between the estimate torque Te and the command torque Tc.

On the other hand, the voltage command value setting section 66 sets the command voltage vdcc in the d-axis as a feedback operation amount in feedbacking the actual current iq in the q-Axis to the above command current iqcc. In more detail, the deviation calculating section 62 calculates a value of the command current iqcc subtracted by the actual current iq. The sign of the value calculated by the deviation calculating section 62 is inverted by the multiplier 64. The voltage command value setting section 66 sets the command voltage vdcc in accordance with the output of the multiplier 64. In this embodiment, the voltage command value setting section 66 performs an integration operation on the difference between the actual current iq and the command current iqcc to calculate the command voltage vqcc.

According to the second embodiment, it is possible to improve the controllability of the field-weakening control by the above described simple configuration. The reason for that is as follows.

Figure 7A:
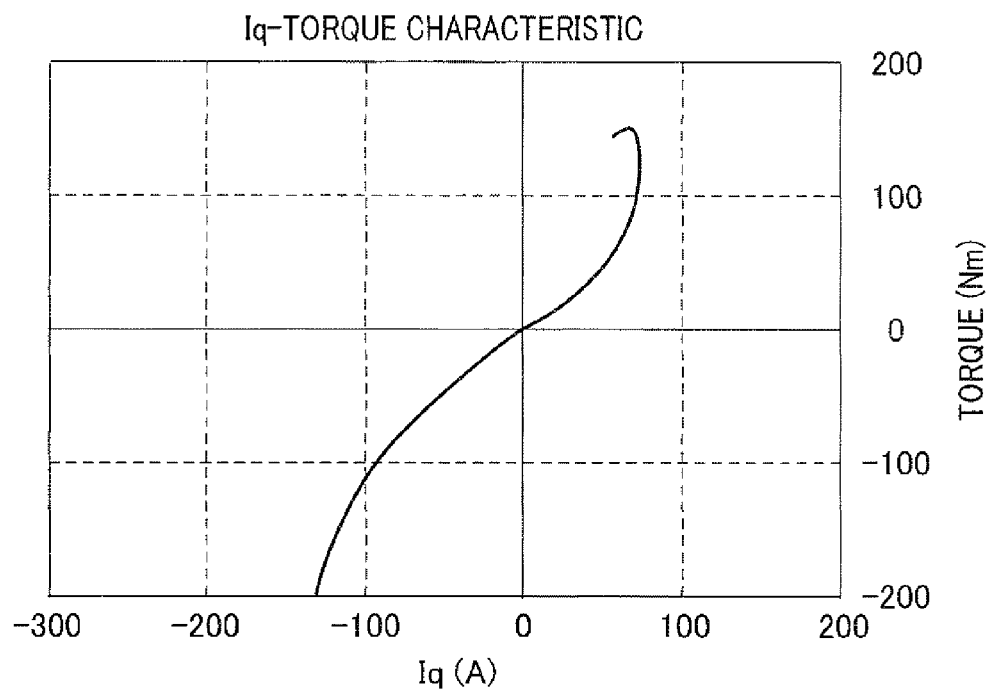
FIG. 7A is a graph showing a relationship between a q-axis current and torque of a motor in high rotational speed region.

FIG. 7A is a graph showing the relationship between the q-axis current and the torque of the motor 10 in the high rotational speed region. As shown in this graph, since the q-axis current and the torque are in nearly a one-to-one relationship, the torque can be uniquely set by determining the q-axis current. In addition, the torque characteristic with respect to the q-axis current is nearly linear. Accordingly, by adjusting the q-axis current, the torque can be controlled smoothly.

Figure 7B:
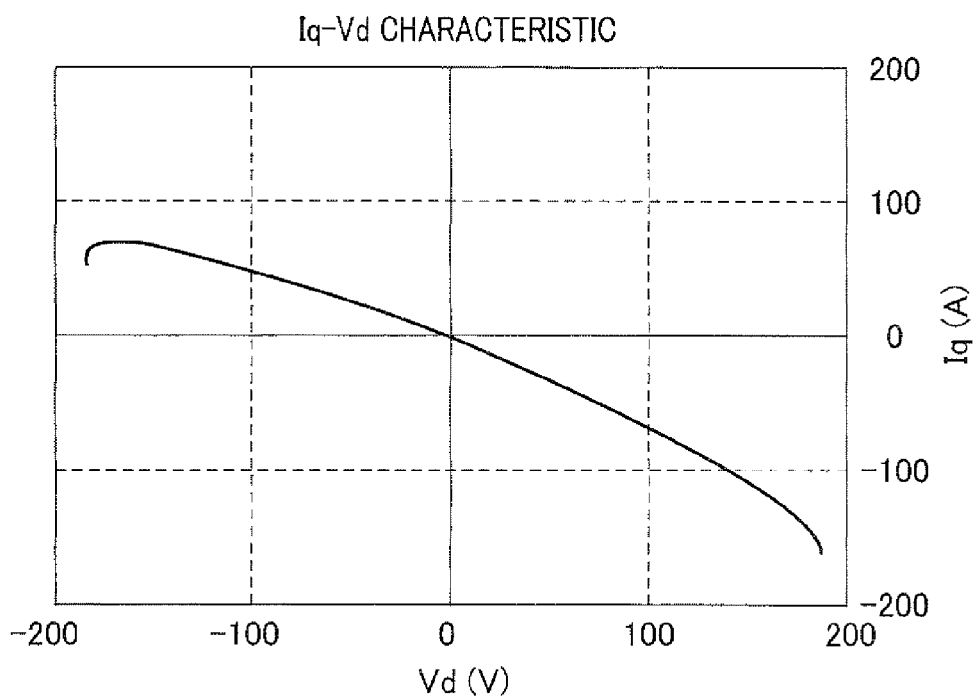
FIG. 7B is a graph showing a relationship between a q-axis current and a d-axis voltage in the high rotational speed region of the motor.

FIG. 7B is a graph showing the relationship between the q-axis current and the d-axis voltage in the high rotational speed region. As shown in this graph, also the characteristic of the d-axis voltage with respect to the q-axis current is nearly linear. This can be explained on the basis of the following voltage equation (c1), in which $\omega$ is an electrical angular velocity, R is resistance, Ld is d-axis inductance, Lq is q-axis inductance, and $\Phi$ is linkage flux of the motor 10.

$$\begin{bmatrix} vd \\ vq \end{bmatrix} = \begin{bmatrix} R + pLd & -\omega Lq \\ \omega Ld & R + pLq \end{bmatrix} \begin{bmatrix} id \\ iq \end{bmatrix} + \begin{bmatrix} 0 \\ \omega \Phi \end{bmatrix} \quad (c1)$$

In the equation (c1), when the electrical angular velocity $\omega$ is sufficiently large, since the terms other than the term of the electrical angular velocity $\omega$ of the right-hand side can be neglected, the d-axis voltage component can be approximated by the equation of $vd \approx -\omega Lq \cdot iq\Phi$. Therefore, the d-axis voltage vd can be regarded to be nearly linear to the q-axis current. Incidentally, since the q-axis voltage component can be approximated by the equation of $Vq \approx \omega Ld \cdot id + \omega \Phi$, the g-axis voltage can be regarded to be nearly linear to the d-axis current. However, since the torque is not uniquely determined depending on the value of the d-axis current, there may occur a case in which the torque has two possible different values for the same d-axis current. Accordingly, in this embodiment, in view of increasing the controllability as much as possible within the confines of relatively simple logic, a torque feedback control is performed directly on the command current on the q-axis.

Next, a design method of the voltage command value setting section 66 is explained.

Figure 8:
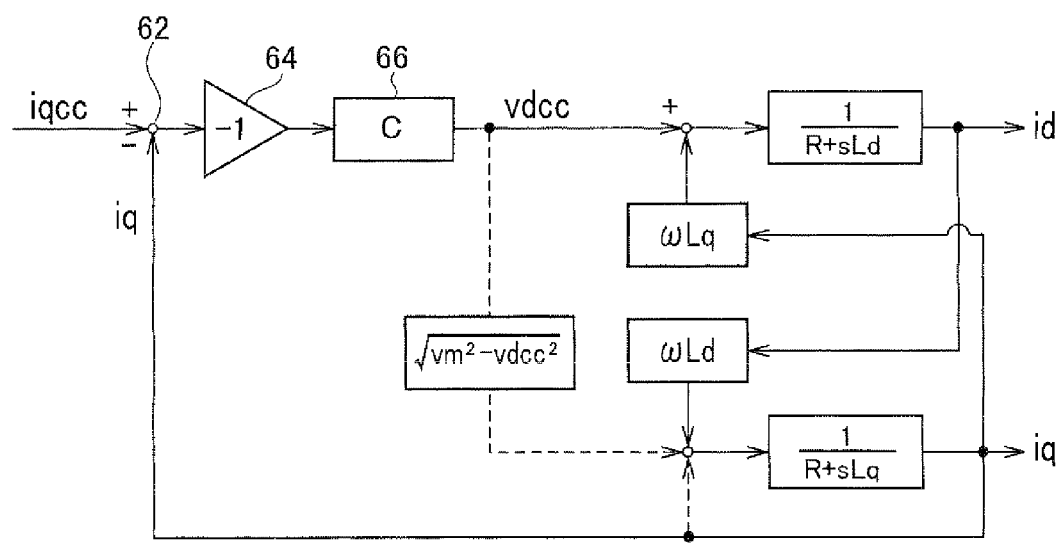
FIG. 8 is a block diagram showing a control system configuration of the control apparatus of the second embodiment.

FIG. 8 is a block diagram showing the control system configuration of the second embodiment. In this block diagram, the voltage command value setting section 66 is denoted as controller C. In FIG. 8, when the signal path shown by the dotted line is neglected, the loop transfer function Gop from the input of the multiplier 64 to the actual current iq in the q-axis is given by the following equation (c2).

$$Gop = \frac{\omega LdC}{LdLq s^2 + R(Ld + Lq)s + R^2 + \omega^2 LdLq} \quad (c2)$$

In the region to perform the field-weakening control, since the electrical angular velocity $\omega$ is large, the term of the square of the resistance R can be neglected. In this case, the equation (c2) can be approximated as the following equation (c3).

$$Gop \approx \frac{\frac{C}{\omega Lq}}{\frac{s^2}{\omega^2} + \frac{R(Ld + Lq)s}{\omega^2 LdLq} + 1} \quad (c3)$$

Here, if the control system configuration can be designed such that the electrical angular velocity is sufficiently high than the torque response frequency, since the relationship of $\omega\cdot\omega \gg \omega c$ holds, the loop transfer function Gop can be approximated as the following equation (c4).

$$Gop = C/\omega Lq \tag{c4}$$

The closed-loop transfer function Gcl whose input is command current iqcc and whose output is the actual current iq is given by Gop/(1+Gop), when the signal path shown by the dotted line in FIG. 8 is neglected. This closed-loop transfer function Gcl can be designed on an arbitrary basis, however in this embodiment, the closed-loop transfer function Gcl is defined as a first-order lag transfer function of $\omega/(s+\omega c)$ to simplify the control system configuration. In this case, the loop transfer function Gop is given by the equation of Gop=$\omega c/s$. Here, by substituting the equation (c4) into this equation, the following equation (c5) can be obtained.

$$C = \omega c L q \omega / s = 2\pi F c \omega L q / s \tag{c5}$$

Figure 9:
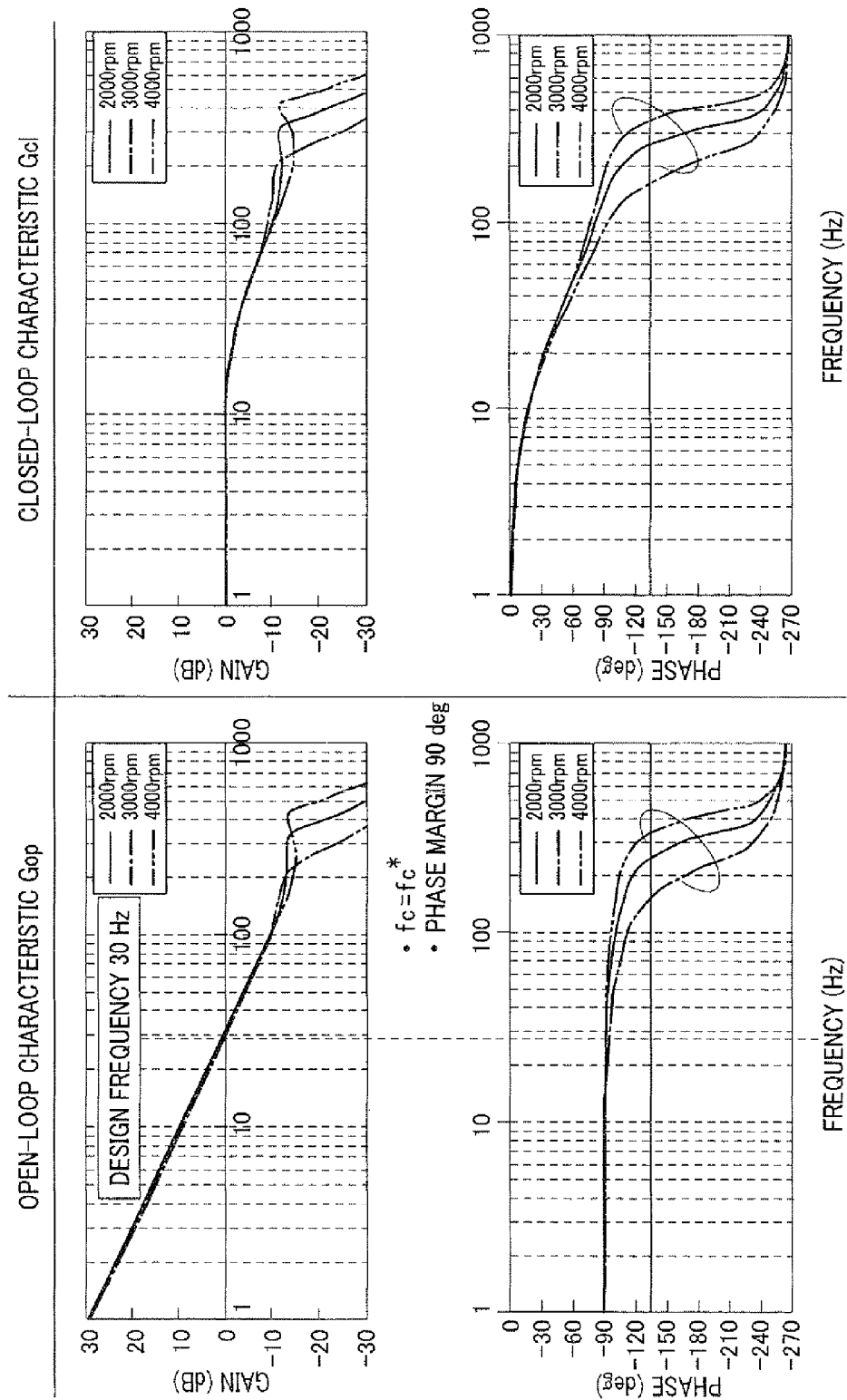
FIG. 9 is a diagram showing a gain characteristic and a phase characteristic of each of a loop transfer function and a closed-loop transfer function of the control system configuration of the control apparatus of the second embodiment.

FIG. 9 is a diagram showing the gain characteristic and phase characteristic of each of the loop transfer function Gop and the closed-loop transfer function Gcl when the torque response frequency is set to 30 Hz. As seen from FIG. 9, both the loop transfer function Gop and the closed-loop transfer function Gcl exhibit a good first-order lag characteristic.

The switching from the vector control to the field-weakening control may be carried out in the same way as in the first embodiment. In this case, the initial value set in the voltage command value setting section 66 may be the command voltage vdc in the d-axis outputted from the command voltage setting section 30. In the second embodiment, the switching from the field-weakening control to the vector control is carried out through the switching process shown in FIG. 10. This switching process, which is performed at regular time intervals, begins by determining whether or not the field-weakening mode flag is on at step S30. If the determination result at step S30 is affirmative, the process proceeds to step S32 where the currents (command currents idc and iqc) to attain the command torque Tc by the vector control are estimated. This estimation can be done by inputting the command torque Tc to the command current setting section 20. At subsequent step S34, the command voltages vdc1 and vqc1 are estimated from the foregoing voltage equation (c1) on the basis of the estimated command currents idc and iqc, and the electrical angular velocity $\omega$. These command voltages vdc1 and vqc1 are application voltages required to attain the command torque Tc by the vector control.

At subsequent step S36, it is determined whether or not the vector norms of the command voltages vdc1 and vqc1 are equal to or smaller than the clamping voltage vm less a predetermined value $\alpha$. Here, $\alpha$, which is a positive small value, is for preventing hunting from occurring during the switching period from the vector control to the field-weakening control and vice versa. If the determination result at step S36 is affirmative, the process proceeds to step S38 to turn off the field-weakening mode flag, to thereby switch to the vector control.

If the determination result at step S30 or S36 is negative, or when step S38 is completed, the process is terminated.

The second embodiment described above provides the following advantages.

(8) The command voltage vdc in the d-axis is set in accordance with the command current iqcc in the q-axis, and the command voltage vqc in the q-axis is set in accordance with the command voltage vdc and the clamping voltage vm. This makes it possible to make the control system configuration simple in structure and excellent in linearity.

(9) The command current iqcc in the q-axis is set in accordance with the difference between the estimate torque Te and the command torque Tc. This makes it possible to perform the torque feedback control.

(10) The output of the integrating section integrating the difference between the actual current iq and the command current iqcc is set as the command voltage vdc in the d-axis. This makes it possible to ensure the control stability by a simple configuration.

(11) The command current iqcc is calculated on the basis of the command torque Tc and the estimate torque Te independently of the command current iqc set by the command current setting section 20. This makes it possible to prevent the command from the vector control and the command from the field-weakening control interfering with each other.

(12) The command voltages vdc1 and vqc1 to enable the vector control to generate the same torque as the torque being generated by the field-weakening control are estimated, and if the vector norms of these estimated voltages are smaller than a predetermined value, the field-weakening control is switched to the vector control. This makes it possible to quantify suppressibility of torque variation during the transition period from the field-weakening control to the vector control.

Third Embodiment

Next, a third embodiment of the invention is described with emphasis on the difference with the second embodiment.

In the foregoing second embodiment, even when the command voltages vuc, vvc and vwc exceed the input voltage of the inverter 38, the vector control is continued before they become 1.27 times the input voltage of the inverter 38. In the overmodulation region in which the modulation rate exceeds 1, harmonic distortion is likely to occur. Particularly, during the period of the vector control in which the current feedback control is performed, harmonic noise is superimposed on the actual currents id and iq being feedback-controlled. This may lower the control stability. Accordingly, in this embodiment, only the proportion gains of the current feedback control are decreased with the increase of the modulation rate. The reason for this is that the proportion gains are sensitive to the transient response characteristic. By this simple configuration in which the integration gains are kept unchanged, and only the proportion gains are decreased with the increase of the moderation rate in the overmodulation region, the effect of harmonic noise can be suppressed in an appropriate manner.

Figure 11:
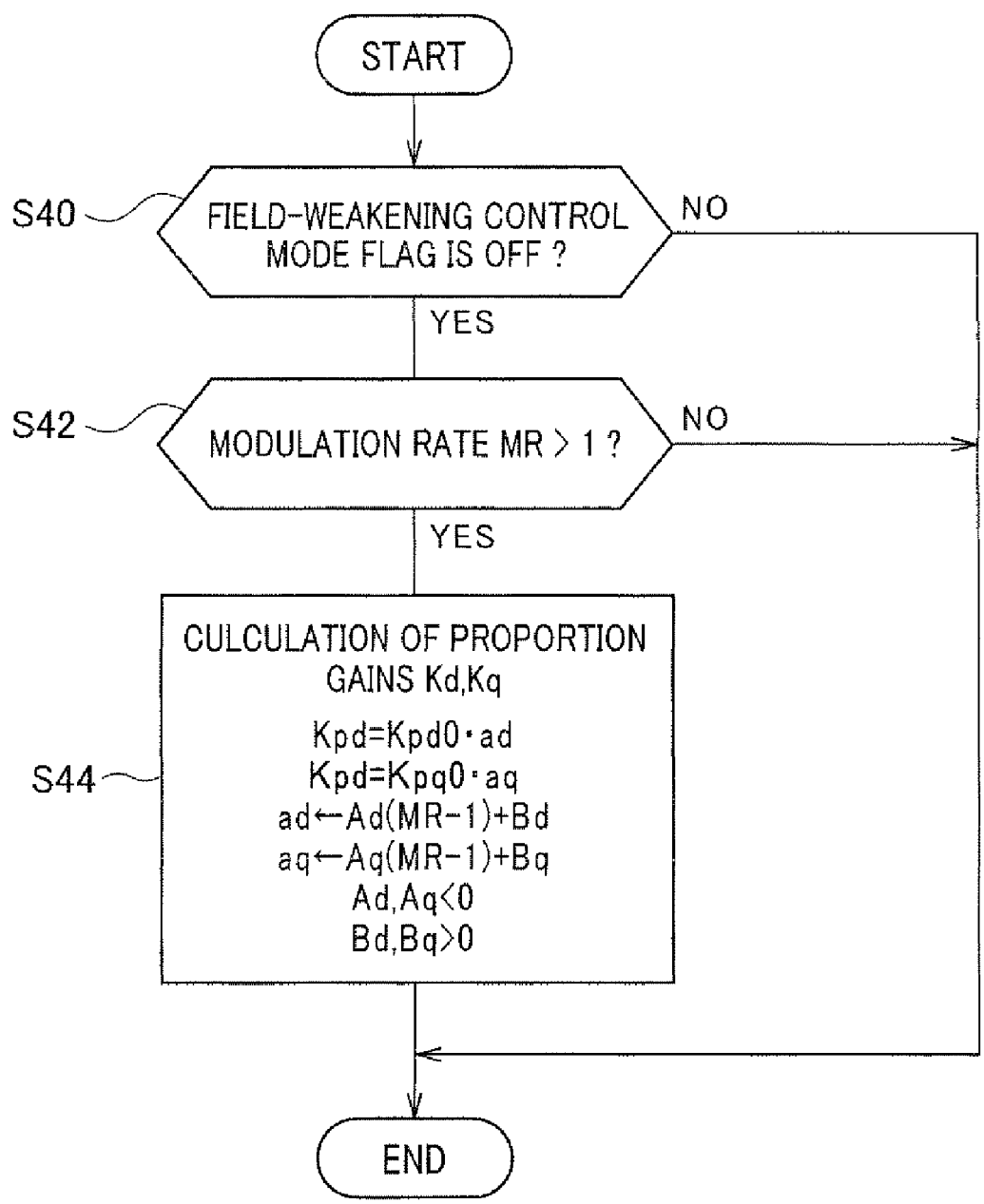
FIG. 11 is a flowchart showing a process to variably set proportion gains of proportional integration operation performed by a control apparatus for an electric rotating machine of a third embodiment of the invention.

FIG. 11 is a flowchart showing the process to variably set the proportion gains. This process, which is performed at regular time intervals, begins by determining whether or not the field-weakening control mode flag is off at step S40. Step S40 is provided for determining whether the vector control is being performed or not. If the determination result at step S40 is affirmative, the process proceeds to step S42 to determine whether or not the modulation rate MR is larger than 1. If the determination result at step S42 is affirmative, the process proceeds to step S44 to calculate the proportion gains Kd and Kp for the current feedback control. The proportion gains Kp and Kd are set such that a they decrease as the absolute value of the difference between the modulation rate and 1 increases. That is, the proportion gains Kp and Kd are set as a linear function of the difference.

If the determination result at step S40 or S42 is negative or when step S44 is completed, the process is terminated.

Figure 12:
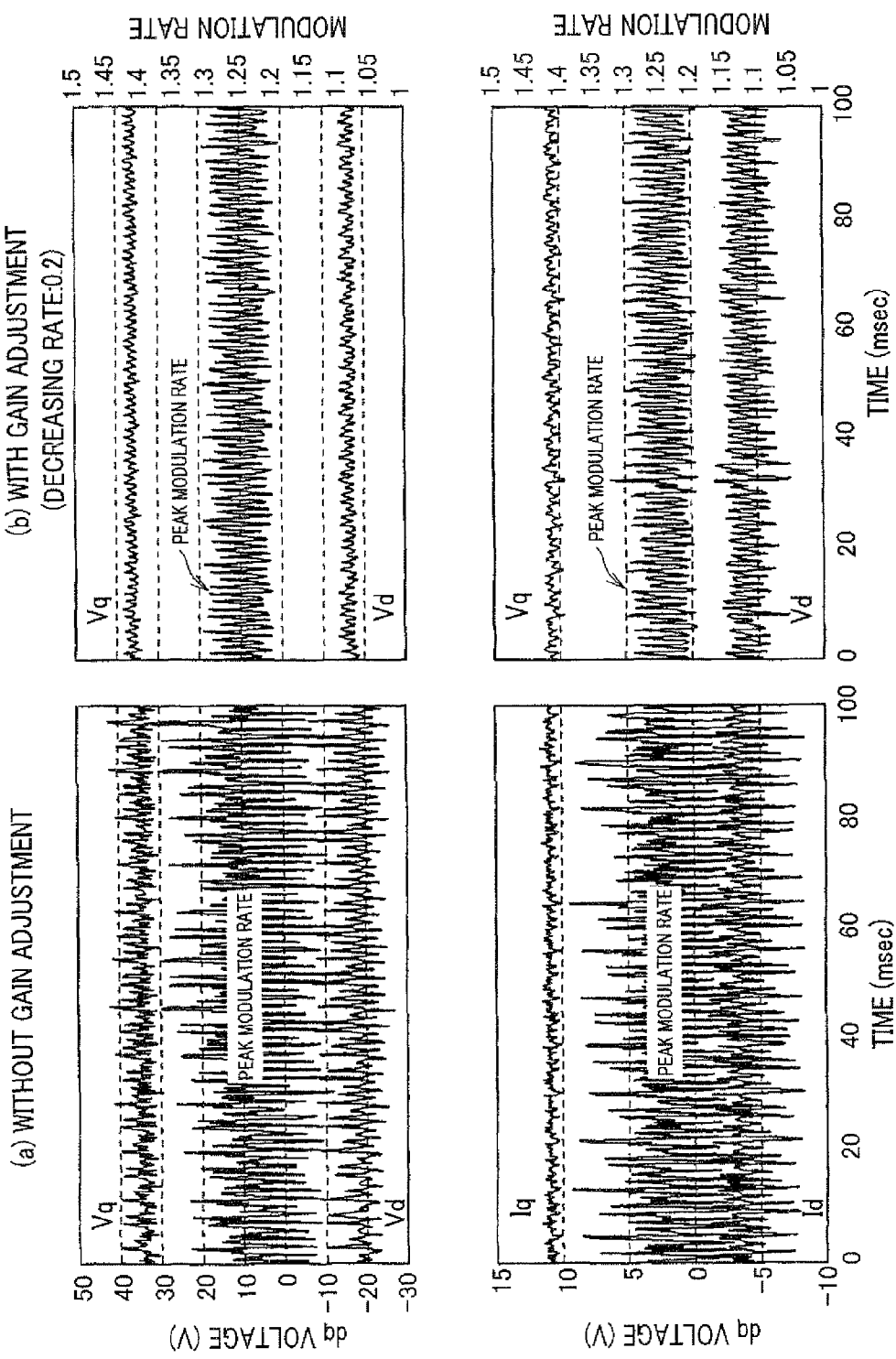
FIG. 12 is a diagram for explaining advantageous effect obtained by proportional integration operation performed by the control apparatus for an electric rotating machine of the third embodiment of the invention.

The advantageous effect of this process is explained with reference to FIG. 12. FIG. 12 shows a case (a) where no adjustment is made to the proportion gains, and a case (b) where the proportion gains are adjusted such that the decrease rate of the proportion gains is 0.2 when the modulation rate is around 1.25. As seen from FIG. 12, the effect of harmonic noise can be effectively reduced by decreasing the proportion gains Kp and Kd in the overmodulation region.

The above described third embodiment provides the following advantages in addition to the advantages provided by the second embodiment.

(13) When the vector control enters the overmodulation region, the proportion gains Kd and Kp for the current feedback control are decreased. This makes it possible to suppress the effect of harmonic noise by a simple configuration.

(14) When the vector control is performed in the overmodulation region, the proportion gains Kd and Kp are gradually decreased depending on the degree by which the modulation rate exceeds 1. This makes it possible to prevent the feedback operation amount from changing sharply in the overmodulation region where the actual feedback operation amount on the voltage for the current feedback is restricted.

(15) When the current feedback control is performed on the basis of the proportional integration operation in the overmodulation region, only the proportion gains are decreased. This makes it possible to suppress the effect of harmonic noise without changing much the design of the configuration for the current feedback control.

Other Embodiments

It is a matter of course that various modifications can be made to the above embodiments as described below.

In the above embodiments, although the clamping voltage vm is set to the terminal voltage vb of the battery 40 multiplied by 1.27 and the square root ⅗, it is not limited thereto. For example, it may be 1. In this case, the control response can be maintained high even without the output linearizing section 44. However, in view of keeping voltage utilization ratio at high level, it is preferable that the ratio of the clamping voltage vm to the terminal voltage vb of the battery 40 is set between 1.15 and 1.27.

Even if the output linearizing section 44 is removed, it is possible to keep the rms value of the drive voltage applied to the motor 10 at the command value before it reaches the clamping voltage vm from when the controllability of the PWM control is significantly lowered, as long as the command voltage setting section 30 performs the feedback control.

The operation of the command voltage setting section 30 is not limited to the one explained with reference to FIG. 2. For example, the command voltage setting section 30 may not perform the decoupling control. However, in this case, it is preferable that the initial value iq0 of the integration term in the proportional integration operation performed at step S20 shown in FIG. 4 is set to the value of Vqcc−Kpq·Δiq.

In the first embodiment, during the period of the field-weakening control, the command voltage vdc is calculated on the basis of the command current idcc outputted from the feedback control section 52 and the actual current id independently of the command current idc in the d-axis set by the command current setting section 20. However, the first embodiment may be modified so as to make a correction to the command current idc set by the command current setting section 20 in accordance with the difference between the command torque Tc and the estimate torque Te during the period of the field-weakening control. However, in this case, it is preferable to carry out the switching form the field-weakening control to the vector when the amount of the above correction is larger than zero, instead of when the command currents idc and iqc are in the predetermined relationship.

The data used to determine the actual torque of the motor 10 is not limited to the estimate torque Te estimated on the basis of the actual currents id and iq. For example, it may be a torque measurement of a torque sensor.

The switching condition from the field-weakening control to the vector control on the basis of the command currents idc and iqc does not necessarily require that the command current on the d-axis is continuous before and after the switching. For example, the switching condition may be such as to require that the vector norms of the command voltages vdc and vqc on the d-axis and q-axis respectively are smaller than the clamping voltage vm.

In the second embodiment, the integration operation on the difference between the command current iqcc and the actual current iq is used as a process for calculating the command voltage vdc in the d-axis as a feedback operation amount in feedbacking the actual current iq in the q-axis to the command current iqcc. However, it is not limited thereto. For example, the control system configuration may be modified such that the closed-loop transfer function Gcl derived by approximation has a second-order delay characteristic.

In the second embodiment, the torque is controlled in accordance with the command current corresponding to only one of the two components of the rotating 2-phase coordinate system, by setting the command voltage corresponding to the one of the two components on the basis of the command voltage corresponding to the other of the two components which corresponds to the command current corresponding to only the one of the two components, and the input voltage of the inverter. However, the process for controlling the torque by use of only one of the two components of the rotating 2-phase coordinate system (may be referred to as "single-command-value control process" hereinafter) is not limited to the one used in the second embodiment. For example, it may be such as to set the command voltage in the d-axis as a feedback operation amount in feedbacking the actual current in the d-axis to the command current. Also in this case, it is possible to make the control system configuration simple and excellent in linearity, because the voltage in the q-axis is in proportion to the current in the d-axis in the high rotational speed region. However, in this case, it may occur that the torque is not determined uniquely with respect to the d-axis current, and has two possible different values for the same d-axis current in accordance with the approximate characteristic in the high rotational speed region. Accordingly, if the vehicle is switched between powering control and regenerative control at frequent intervals, the controllability may be lowered. Therefore, it is preferable to apply the configuration described above to only one of powering control and regenerative control.

In the second embodiment, during the period of the field-weakening control, the command voltage vdcc is calculated on the basis of the difference between the command current iqcc outputted from the feedback control section 52 and the actual current iq independently of the command current idc in the d-axis set by the command current setting section 20. However, the second embodiment may be modified so as to calculate the command current iqcc by collecting the command current iqc set by the command current setting section 20 on the basis of the difference between the command torque Tc and the estimate torque Te.

The second embodiment may be modified so as to perform an open-loop control on the command torque Tc instead of performing the torque feedback control during the period of the field-weakening control. This can be implemented by setting the command current iqcc in accordance with the command torque Tc.

Figure 10:
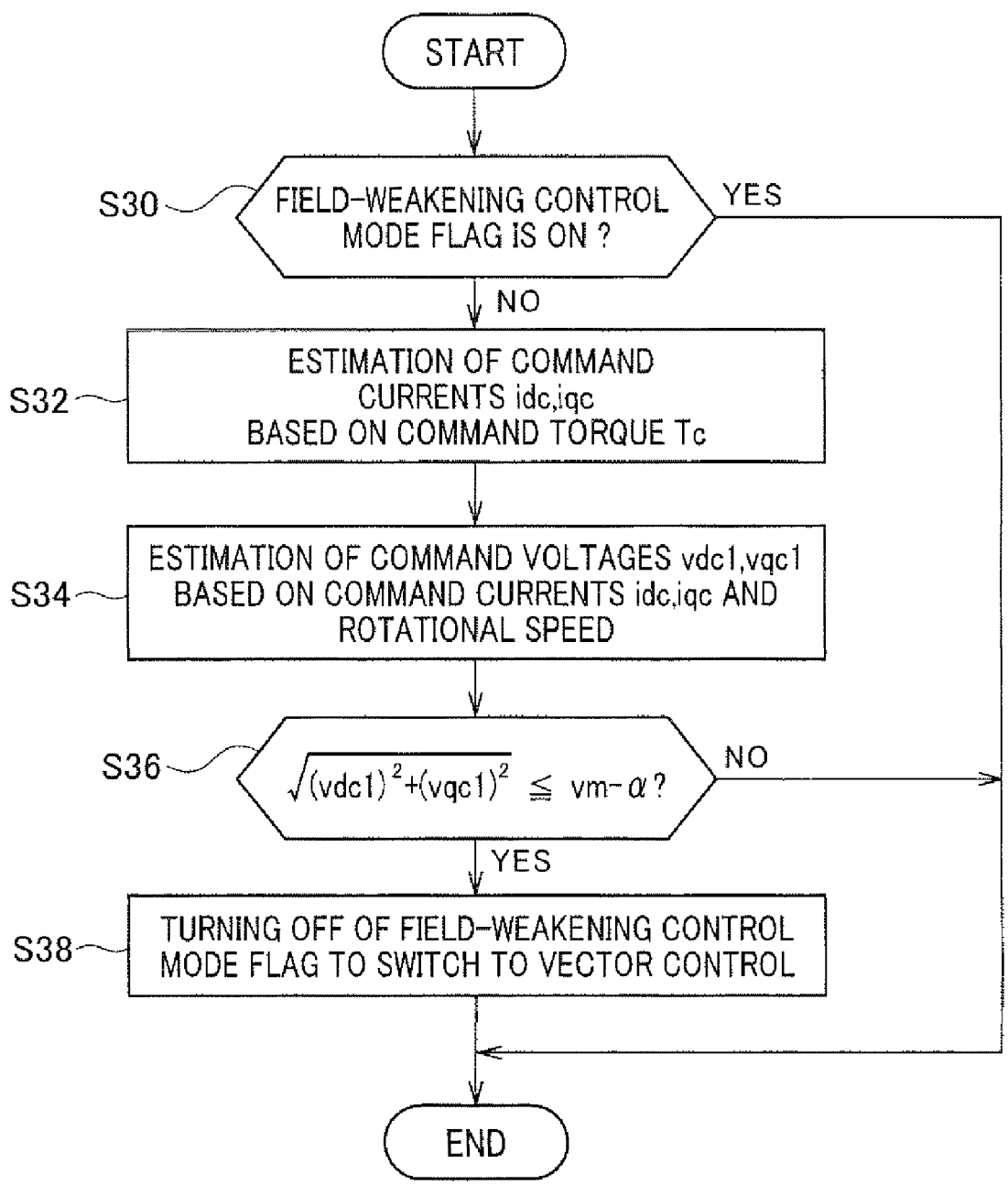
FIG. 10 is a flowchart showing a switching process to switch from field-weakening control to vector control in the control apparatus of the second embodiment.

In the second embodiment, the switching from the field-weakening control to the vector control is performed through the process shown in FIG. 10. However, the second embodiment may be modified to switch the field-weakening control to the vector control on condition that the actual currents id and iq agree respectively with the present command currents idc and iqc set by the command value setting section 20.

The operation performed by the feedback control section 52 is not limited to the proportional integration operation on the difference between the estimate torque Te and the command torque Tc. For example, the feedback control section 52 may be configured to perform a proportional integration and differentiation operation.

The operation performed by the feedback control section 30a is not limited to the proportional integration operation on the difference between the actual current id and the command current idc. For example, the feedback control section 30a may be configured to perform a proportional integration and differentiation operation.

The operation performed by the feedback control section 30c is not limited to the proportional integration operation on the difference between the actual current iq and the command current iqc. For example, the feedback control section 30c may be configured to perform a proportional integration and differentiation operation.

In the first embodiment, the motor torque is controlled in accordance with only the command current id in the d-axis during the period of the field-weakening control, by setting the command voltage vdc in accordance with the command current idcc in the d-axis, and setting the command voltage vqc in accordance with the terminal voltage vb of the battery 40 and the command voltage vdcc. However, it is not limited thereto. For example, as shown in FIG. 13, the first embodiment may be modified to set the command voltage vqcc in accordance with the command current iqcc in the q-axis, and set the command voltage vdc in the d-axis in accordance with this command voltage vqcc and the terminal voltage vb of the battery 40.

Figure 13:
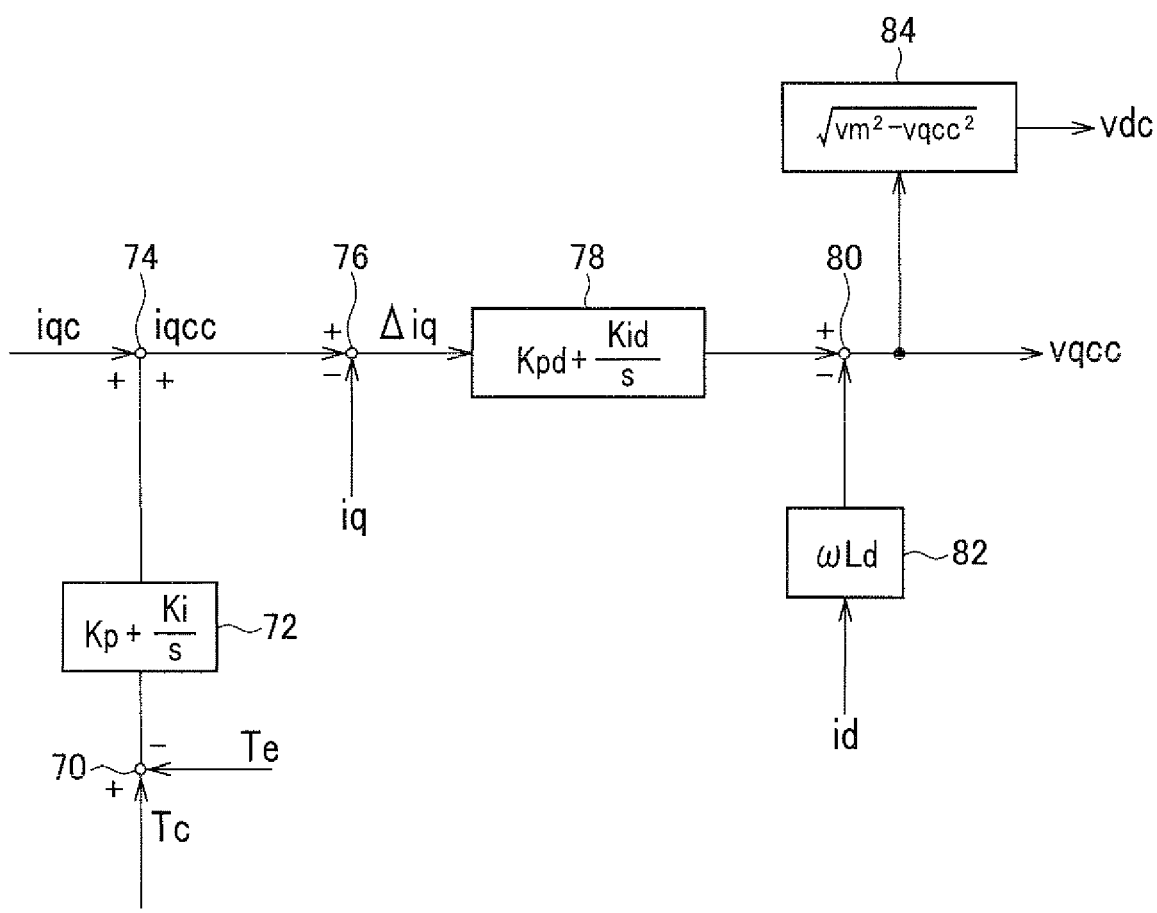
FIG. 13 is a block diagram for explaining a process to set a command voltage performed by a control apparatus of a variant of the first embodiment.

In the example shown in FIG. 13, the deviation calculating section 70 calculates the difference between the estimate torque Te and the command torque Tc, and the correction amount calculating section 72 calculates a correction amount of the command current iqc by performing a proportional integration operation on this calculated difference. Thereafter, the correcting section 74 calculates the command current iqcc by correcting the command current iqc in accordance with the output of the correction amount calculating section 72. The deviation calculating section 76 calculates the difference Δiq between the command current iqcc and the actual current iq, and the feedback control section 78 calculates a feedback operation amount of voltage on the basis of this difference Δiq. On the other hand, the correcting section 80 calculates the command voltage vqcc in the q-axis by correcting the feedback operation amount in accordance with the decoupling term calculated by the decoupling term control section 82. On the other hand, the d-axis voltage calculating section 84 calculates, as the command voltage vdc in the d-axis, the square root of the square of the clamping voltage vm less the square of the command voltage vqcc. Incidentally, in the example shown in FIG. 6, the command current iqcc may be calculated on the basis of the difference between the estimate torque Te and the command torque Tc independently of the command current iqc.

The single-command-value control process to control the motor torque is not limited to the one described above which controls the motor torque in accordance with the command current corresponding to only one of the two components of the rotating 2-phase coordinate system, by setting the command voltage corresponding to the other of the two components on the basis of the command voltage corresponding to the one of the two components depending on the command current corresponding to the one of the two components, and the input voltage of the power conversion circuit. For example, such a single-command-value control process may be applied to the fixed 2-phase coordinate system. In this case, the command voltages in the α-axis and β-axis are set by using only one of the command currents.

The input voltage of the power conversion circuit is not limited to the terminal voltage vb of the battery 40. For example, it may be the output voltage of a step-up circuit connected to the battery 40 to step-up the terminal voltage vb of the battery 40.

The motor 10 of the salient-pole type is not limited to the IPMSM. For example, it may be a SPM (Surface Permanent Magnet Motor).

Although the above embodiments have been described as being applied to a three-phase motor as an electric rotating machine, the present invention is applicable to a three-phase generator.

The above explained preferred embodiments are exemplary of the invention of the present application which is described solely by the claims appended below. It should be understood that modifications of the preferred embodiments may be made as would occur to one of skill in the art.

What is claimed is:

1. An apparatus for controlling a torque of an electric rotating machine at a command torque by supplying command voltages in accordance with said command torque to a power conversion circuit driving said electrical rotating machine; comprising:
   a detecting function of detecting an input voltage of said power conversion circuit to be power-converted and thereafter applied to said electric rotating machine as a drive voltage; and
   a first control function of setting a command current corresponding to one of two current components in a 2-phase coordinate system of said electric rotating machine in accordance with a command torque directed from outside, and thereafter determining command voltages corresponding to two voltage components of said 2-phase coordinate system on the basis of said command current and said input voltage of said power conversion circuit, to thereby enable controlling a torque of said electric rotating machine in accordance with only said command current corresponding to one of two current components of said 2-phase coordinate system.

2. The apparatus according to claim 1, wherein said 2-phase coordinate system is a rotating 2-phase coordinate system, and said first control function determines a command voltage corresponding to one of two voltage components of said rotating 2-phase coordinate system on the basis of a command voltage corresponding to the other of two voltage components of said rotating 2-phase coordinate system which depends on a command current corresponding to one of two current components of said rotating 2-phase coordinate system, and said input voltage of said power conversion circuit.

3. The apparatus according to claim 2, wherein each of said one of said two voltage or current components is a component in a first direction perpendicular to a magnetic-pole direction of said electric rotating machine, and said other of said two voltage components is a component in a second direction parallel to said magnetic-pole direction.

4. The apparatus according to claim 3, wherein said first control function has a setting function of setting said command current in said first direction in accordance with said command torque.

5. The apparatus according to claim 4, wherein said setting function sets said command current in said first direction on the basis of a difference between an actual torque of said electric rotating machine and said command torque.

6. The apparatus according to claim 3, wherein said first control function sets said command voltage in said first direction as a feedback operation amount in feedbacking an actual current in said first direction of said electric rotating machine to said command current in said first direction.

7. The apparatus according to claim 6, wherein said first control function includes an integration function of integrating a difference between said actual current in said first direction and said command current, and sets an output of said integration function as said command voltage in said second direction.

8. The apparatus according to claim 1, further comprising a second control function of setting a command current in a first direction perpendicular to a magnetic-pole direction of said electric rotating machine and a command current in a second direction parallel to said magnetic-pole direction in accordance with said command torque to thereby determine a command voltage in said first direction and a command voltage in said second direction, and a switching function of switching said second control function to said first control function when said command voltages determined by said second control function exceed a predetermined value.

9. The apparatus according to claim 8, wherein said switching function is configured to switch said second control function to said first control function when said drive voltage to be applied to said electric rotating machine exceeds a predetermined clamping voltage higher than said input voltage of said power conversion circuit, said switching function including a generating function of generating an operation signal for said power conversion circuit by PWM-modulating said drive voltage, and a correcting function of increasing said drive voltage to be PWM-modulated depending on a degree by which said drive voltage exceeds said input voltage of said power conversion circuit.

10. The apparatus according to claim 8, wherein said first control function sets said command current in said first direction in accordance with said command torque independently of said command currents set by said second control function.

11. An apparatus for controlling a torque of a salient-pole type electric rotating machine at a command torque by supplying command voltages corresponding to voltage components of a 2-phase coordinate system of said electric rotating machine in accordance with said command torque to a power conversion circuit driving said electrical rotating machine, comprising:

a detecting function of detecting an input voltage of said power conversion circuit to be power-converted and thereafter applied to said electric rotating machine as a drive voltage; and a first control function of setting at least one of command currents corresponding to current components of said 2-phase coordinate system in accordance with said command torque to thereby determine said command voltages;

wherein said first control function sets, on the basis of said command voltage corresponding to one of said two voltage components which depends on said one of said current components and said input voltage of said power conversion circuit, said command voltage corresponding to the other of said two voltage components, when said command voltage corresponding to said one of said two voltage components exceeds a predetermined value to thereby enable controlling a torque of said electric rotating machine in accordance with only said command current corresponding to said one of said two current components.

12. The apparatus according to claim 11, wherein said one of said two current components is a component in a first direction parallel to a magnetic-pole direction of said electric rotating machine, and said other of said two voltage components is a component in a second direction perpendicular to said magnetic-pole direction.

13. The apparatus according to claim 12, wherein said first control function sets said command current in said first direction on the basis of a difference between an actual torque of said electric rotating machine and said command torque.

14. The apparatus according to claim 12, further comprising a second control function of setting said command current in said first direction and said command current in a second direction in accordance with said command torque to thereby determine said command voltage in said first direction and said command voltage in said second direction, and a switching function of switching said second control function to said first control function when said command voltages determined by said second control function exceed a predetermined value.

15. The apparatus according to claim 14, wherein said first control function sets said command current in said first direction in accordance with said command torque independently of said command currents set by said second control function.

16. The apparatus according to claim 14, wherein said switching function switches said first control function to said second control function when said command current in said first direction set by said first control function becomes equal to said command current in said first direction set by said second control function.

17. The apparatus according to claim 14, wherein said second control function sets said command voltage in said second direction by performing an integration operation on a difference between an actual current in said second direction of said electric rotating machine and said command current in said second direction set by said second control function, and sets an initial value of said integration operation in accordance with said command voltage in said second direction set by said first control function, when said first control function is switched to said second control function.

18. The apparatus according to claim 14, wherein said switching function is configured to switch said second control function to said first control function when said drive voltage to be applied to said electric rotating machine exceeds a predetermined clamping voltage higher than said input voltage of said power conversion circuit, said switching function including a generating function of generating an operation signal for said power conversion circuit by PWM-modulating said drive voltage, and a correcting function of increasing said drive voltage to be PWM-modulated depending on a degree by which said drive voltage exceeds said input voltage of said power conversion circuit.

* * * * *